(12) United States Patent
Carter et al.

(10) Patent No.: US 9,618,034 B2
(45) Date of Patent: Apr. 11, 2017

(54) THRUST WASHER

(71) Applicants: Mahle International GmbH, Stuttgart (DE); Mahle Engine Systems UK Limited, Rugby (GB)

(72) Inventors: Jeff Carter, Warwick (GB); Bredo Leipprand, Stuttgart (DE); Jonathan Forder, Rugby (GB)

(73) Assignees: Mahle International GmbH (DE); Mahle Engine Systems UK Limited (GB)

( * ) Notice: Subject to any disclaimer, the term of this patent is extended or adjusted under 35 U.S.C. 154(b) by 1 day.

(21) Appl. No.: 14/652,103

(22) PCT Filed: Dec. 5, 2013

(86) PCT No.: PCT/GB2013/053212
§ 371 (c)(1),
(2) Date: Jun. 12, 2015

(87) PCT Pub. No.: WO2014/091206
PCT Pub. Date: Jun. 19, 2014

(65) Prior Publication Data
US 2015/0323001 A1    Nov. 12, 2015

(30) Foreign Application Priority Data
Dec. 14, 2012 (GB) .................................. 1222651.0

(51) Int. Cl.
*F16C 17/04* (2006.01)
*F16C 33/10* (2006.01)
(Continued)

(52) U.S. Cl.
CPC .............. *F16C 9/02* (2013.01); *F16C 17/045* (2013.01); *F16C 33/107* (2013.01);
(Continued)

(58) Field of Classification Search
CPC .... F16C 17/04; F16C 17/045; F16C 33/1065; F16C 33/20; F16C 33/203; F16C 33/205;
(Continued)

(56) References Cited

U.S. PATENT DOCUMENTS 3,094,376 A * 6/1963 Thomas ............ B29C 45/14754
264/135
3,218,383 A * 11/1965 White ................. F16C 11/0633
264/130
(Continued)

FOREIGN PATENT DOCUMENTS

CN    1735755 A    2/2006
EP    1584828 A1   10/2005
(Continued)

OTHER PUBLICATIONS

English abstract for EP-2574481.
Chinese office action fro CN-2016080101723020, dated Aug. 4, 2016.

*Primary Examiner* — Phillip A Johnson
(74) *Attorney, Agent, or Firm* — Fishman Stewart PLLC (57) ABSTRACT

A thrust washer for a sliding bearing may include a thrust washer substrate having an axial face. The thrust washer may also have a polymer layer of profiled thickness on the axial face of the substrate. The profiled polymer layer may be provided with at least one oil distribution groove.

17 Claims, 12 Drawing Sheets

(51) Int. Cl.
*F16C 9/02* (2006.01)
*F16C 33/20* (2006.01)
*F16C 9/04* (2006.01)

(52) U.S. Cl.
CPC .......... *F16C 33/203* (2013.01); *F16C 33/205* (2013.01); *F16C 33/208* (2013.01); *F16C 9/04* (2013.01); *F16C 2240/42* (2013.01); *F16C 2240/60* (2013.01)

(58) Field of Classification Search
CPC .. F16C 33/206; F16C 33/208; F16C 2240/42; F16C 2240/60; F16C 9/02; F16C 9/04
USPC ........ 384/291, 292, 297, 299, 300, 420, 288
See application file for complete search history.

(56) References Cited

U.S. PATENT DOCUMENTS

| | | | |
|---|---|---|---|
| 4,348,065 A * | 9/1982 | Yoshioka | F16C 33/1075 384/121 |
| 6,921,210 B2 * | 7/2005 | Welch | F16C 9/02 384/123 |
| 2002/0094143 A1 | 7/2002 | Yang et al. | |
| 2006/0034556 A1 * | 2/2006 | Thompson | F16C 9/02 384/288 |
| 2006/0083451 A1 | 4/2006 | Kawagoe et al. | |
| 2006/0288579 A1 | 12/2006 | Luo et al. | |
| 2009/0208154 A1 * | 8/2009 | Kirchhof | B23K 26/28 384/297 |
| 2013/0195388 A1 | 8/2013 | Ishii et al. | |

FOREIGN PATENT DOCUMENTS

| | | |
|---|---|---|
| EP | 1752670 A1 | 2/2007 |
| EP | 2574481 A2 | 4/2013 |
| WO | WO-2009/140745 A1 | 11/2009 |
| WO | WO-2012/043332 A1 | 4/2012 |
| WO | WO-2013/094351 A1 | 6/2013 |

* cited by examiner

THRUST WASHER

CROSS-REFERENCE TO RELATED APPLICATIONS

This application claims priority to British Patent Application No. 1222651.0, filed Dec. 14, 2012, and International Patent Application No. PCT/GB2013/053212, filed Dec. 5, 2013, both of which are hereby incorporated by reference in their entirety.

TECHNICAL FIELD

The present invention relates to thrust washers having an axial face provided with oil distribution grooves, in particular thrust washers for use in automotive engines, transmission, pump and compressor systems.

BACKGROUND

In internal combustion engines, the bearing assemblies typically each comprise a pair of half-bearings retaining a crankshaft that is rotatable about an axis. At least one half-bearing is a flange half-bearing that comprises a hollow generally semi-cylindrical bearing shell provided with a generally semi-annular thrust washer extending outwardly (radially) at each axial end. In some half-bearings, a single-piece construction of the bearing shell and thrust washers is used, whilst in other half-bearings, the bearing shell and the thrust washer are loosely mechanically engaged with clip-like features, and in a further type of half-bearing the thrust washers are permanently assembled onto the bearing shell by deformation of engagement features. In other bearing assemblies it is also known to use annular or circular thrust washer.

Once the engine has started, lubricating oil is provided between the axial journal parts of the crankshaft and the bearing shells, and between the thrust washers and the counterfaces of associated webs of the crankshaft that extend perpendicular to the rotational axis of the crankshaft. However, when the engine starts, the oil pressure is low and may provide inadequate lubrication if the shaft contacts the bearing shell or a thrust washer. Further, even when the oil is supplied at normal operating pressures, axial forces on the shaft (e.g. when a gear change is performed, or due to the design of some automatic gearboxes) may cause the shaft to contact the thrust washer. Accordingly, the thrust washer and bearing shell are provided with running surfaces that can withstand such occasional contacts. Known bi-metal thrust washers comprise a steel backing (substrate) provided with an aluminium-tin (or copper-based alloy) running layer on an axial face of the substrate, with oil distribution grooves being provided either by machining a profile into the running layer, or by an embossing operation that provides a profile by causing deformation of the aluminium-tin running layer.

Fuel-saving operating schemes have become popular for automotive engines, which increase the frequency with which the engine is started. Under a "stop-start" operating scheme, stopping and restarting vehicle movement also leads to the engine being stopping and being restarted. Under a "hybrid" operating scheme, the engine is turned off when the vehicle can be powered by an alternative power source, commonly being electrically powered. The greater frequency with which the engine is started under such operating schemes places an increased demand upon the performance of the thrust washers and bearing shells by increasing the frequency with which the counterface of the associated web and journals of the crankshaft respectively contact the thrust washers and bearing shells, and cause correspondingly increased wear of the running surfaces.

Oil distribution grooves extend outwardly across the axial running face, e.g. radially from the inner edge to the outer edge. The grooves may comprise a deep channel with a gently sloping ramp on each side, between the channel and pad regions. The ramp region provides a tapered clearance between the thrust washer and the counterface of the crankshaft web, in use, assisting to draw lubricating oil out of the grooves across the axial face of the thrust washer, and providing a hydrodynamic wedge of lubrication oil to assist in maintaining separation of the thrust washer and the counterface of the web. Known oil distribution grooves are machined (e.g. milled) into the running layer, or formed by an embossing process. However, the manufacturing tolerances of cost effective machining or embossing processes are significant, relative to the depth of the grooves, in particular with respect to any ramp regions, increasing manufacturing complexity.

Known bi-metal washers are manufactured by stamping blanks from a bi-metal sheet, such that the manufacturing process produces bi-metal waste. Similarly, such washers produce further bi-metal waste at the end-of-life. However, such bi-metal waste is difficult to recycle, due to the difficulty in separating the metals (i.e. separating the steel backing from the running layer).

SUMMARY

A first aspect of the invention provides a thrust washer for a sliding bearing, comprising a thrust washer substrate having an axial face, and a polymer layer of profiled thickness on the axial face of the substrate, wherein the profiled polymer layer is provided with at least one oil distribution groove.

A second aspect of the invention comprises a flange bearing comprising a bearing shell and a thrust washer according to the first aspect, wherein the thrust washer is provided at an axial end of the bearing shell. The flange bearing (i.e. one or two thrust washers and a bearing shell) may be detachably, loosely clipped together, assembled to be inseparably physically engaged, or comprise a single-part construction.

A third aspect of the invention provides a method of manufacturing a thrust washer according to the first aspect of the invention, the method comprising forming the polymer layer of profiled thickness on the axial face of the thrust washer substrate, and curing the profiled polymer layer.

Advantageously, the profiled polymer layer may be more resilient against wear than the metal running layer of known bi-metal thrust washers.

Advantageously, due to the accuracy with which the profiled polymer layer may be deposited onto the substrate (either before or after the substrates are stamped out or otherwise formed from a sheet), the thrust washers may be manufactured without the production of bi-material waste. Further, at the end-of-life, disposal of a metal and polymer bi-material thrust washer may be less difficult than that of known bi-metal thrust washers.

Advantageously, the oil distribution groove may be formed more accurately in the profiled polymer layer than on a bi-metal thrust washer.

Wear resistance of the polymer running layer may be greater than a metallic (e.g. aluminium-tin) running layer, in particular in the case that the polymer layer comprises metallic particulate dispersed throughout the polymer. Further, the polymer layer may provide a lower coefficient of friction and greater compatibility than an aluminium-tin running layer, particularly in the case that the polymer layer comprises solid lubricant particulate dispersed throughout the polymer.

Advantageously, the manufacturing costs to form the oil distribution groove in the profiled polymer layer is less than to form the groove by machining a known bi-metal thrust washer, due to the lower cost of the raw materials.

Deposition of the profiled polymer layer avoids the risk of generating bi-metallic swarf from machining the running layer of known bi-metal thrust washers, and so simplifies waste disposal.

The thrust washer may be generally semi-annular, annular or circular.

The thrust washer may be provided with 1 to 10 oil distribution grooves. A thrust washer having an inner edge with a diameter of less than 70 mm, may have a 1 to 7 oil distribution grooves. A thrust washer having a diameter of 70 mm or more may have 1 to 10 oil distribution grooves.

The profiled polymer layer may have a maximal thickness of 20 to 100 µm, after it has been fully cured.

The profiled polymer layer may comprise a stacked plurality of polymer sub-layers.

The polymer sub-layers may be differently patterned.

The oil distribution groove may extend only part way through the profiled polymer layer.

The oil distribution groove may extend through the profiled polymer layer, and the profiled polymer layer may comprise a plurality of disconnected portions, separated by the at least one oil distribution groove.

The oil distribution groove may extend into the thrust washer substrate.

The oil distribution groove may each comprise a channel and a ramp region. The channel region is the most deeply recessed part of the groove, and the ramp region has a low ramp slope.

The ramp region may be provided in the profiled polymer layer, and the thickness of the profiled polymer layer in the ramp region may increase away from the channel. Advantageously, a channel region of the oil distribution groove may be formed in the substrate by a rapid manufacturing process (e.g. by machining or embossing), whilst the ramp region is formed by a less expensive process (e.g. by multi-layer deposition).

The ramp regions may have a ramp slope in which the increase in thickness of the polymer is less than 25 µm per 1 mm across the axial face, perpendicular to the oil distribution groove.

The oil distribution groove may comprise a channel between a first ramp region and a second ramp region. The first and second ramp regions may have different ramp slopes. Advantageously, the use of different ramp slopes may optimise the thrust washer for a particular direction of crankshaft rotation. The oil distribution groove may comprise the channel and one ramp region, the channel being bounded by an abrupt edge on the other side from the ramp region. Alternatively, the oil distribution groove may comprise a channel region between abrupt edges of the profiled polymer layer.

The profiled polymer may be provided with pad regions of uniform thickness between adjacent oil distribution grooves.

The profiled polymer layer may be a plastics polymer material selected from the group consisting of: polyimide/amide resin, acrylate resin, epoxy resin, fluoropolymer (e.g. PTFE) and formaldehyde. The profiled polymer layer may comprise a composite of a plastics polymer matrix with particulate dispersed throughout the matrix. The particulate may be hard particulate (e.g. ceramic powder, silica, and metal powder such as aluminium flakes) and/or soft particulate (e.g. $MoS_2$ and graphite, and fluoropolymer such as PTFE). The polymer may comprise a matrix of a polyimide/amide plastics polymer material and having distributed throughout the matrix: from 5 to less than 25% vol of a metal particulate (e.g. metal powder and/or metal flakes); from 1 to 20% vol of a fluoropolymer, the balance being the polyimide/amide resin apart from incidental impurities.

The profiled polymer layer may be by a process selected from the group consisting of: a spraying process, and a printing process.

The profiled polymer layer may be formed by depositing a plurality of polymer sub-layers.

Successive polymer layers may be differently patterned, to build up a profiled polymer layer of non-uniform thickness.

The plurality of polymer sub-layers may comprise sub-layers of different thicknesses. Advantageously, use of sub-layers of different thicknesses may provide greater control of the thickness of the profiled polymer layer.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals, albeit in some cases having one or more of: increments of integer multiples of 100; and, typographical marks (e.g. primes). For example, in different figures, 100, 100', 200, 200', 300, 300', 400, 400' and 400", 500, 500' and 600 have been used to indicate a thrust washer.

Figure 1A:
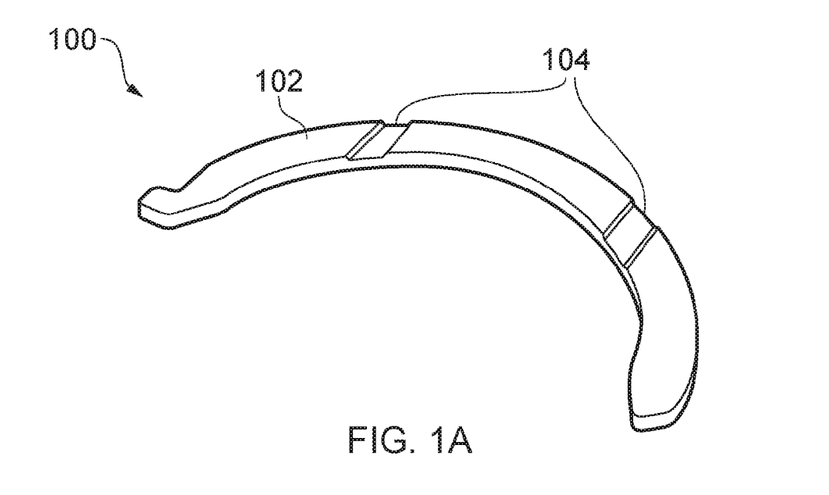
FIGS. 1A and 1B show perspective views of thrust washers according to the present invention.

FIG. 1A illustrates a thrust washer 100 that has a substantially semi-annular shape (e.g. it may have projecting hooks and tabs, and tapers from a generally semi-annular shape, for engagement with other parts of the bearing assembly). An axial face 102 (i.e. a face perpendicular to the axis of rotation of a shaft received into a bearing assembly comprising the thrust washer) of the thrust washer 100 has parallel oil distribution grooves 104 running between the inner and outer edges of the thrust washer. In use, lubricating oil is pumped into the bearing clearance between the corresponding bearing shell and rotating crankshaft journal, and leaks out into the further clearance between the thrust washer and the counterface of the rotating crankshaft web. The provision of the oil distribution grooves 104 in the axial face 102 of the thrust washer 100 enhances the quality of the oil film between the thrust washer and the shaft.

Figure 1B:
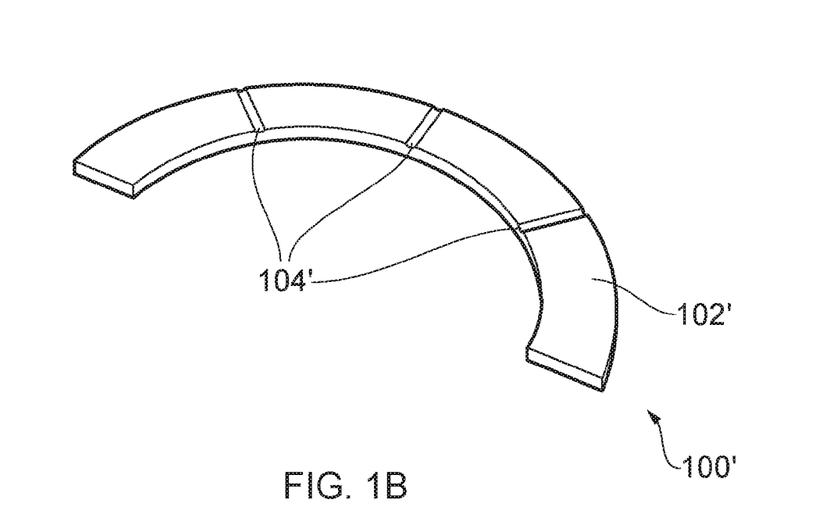

FIG. 1B illustrates an alternative arrangement of oil distribution grooves 104' on the axial face 102' of a further thrust washer 100', in which the oil distribution grooves are aligned radially on the axial face.

Figure 2A:
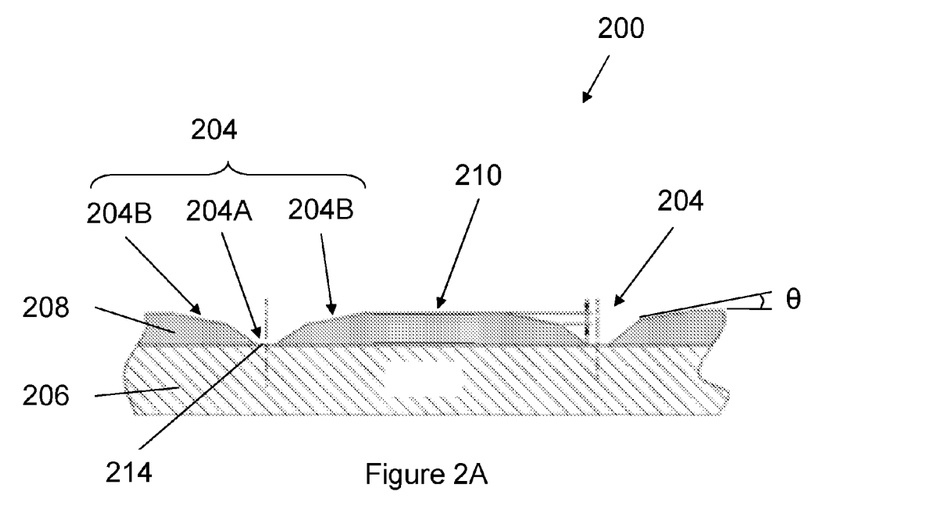
FIG. 2A shows a cross-sectional view of a thrust washer according to a first embodiment the present invention, formed by a first manufacturing method.

FIG. 2A illustrates a cross-sectional view through part of such a thrust washer 200, viewed perpendicular to the oil distribution grooves 204. The thrust washer 200 comprises a metal substrate (e.g. a steel backing) 206 and a profiled polymer layer 208 on an axial face of the substrate.

The polymer layer 208 is profiled to provide oil distribution grooves 204 between pad regions 210 of uniform thickness. The oil distribution grooves 204 each comprise a channel 204A and ramp regions 204B between the channel and the neighbouring pad regions 210. In the illustrated example, the ramp regions 204B have a low ramp slope θ of approximately 1:300 to 1:100, e.g. 1:200, corresponding to approximately ⅓°.

The profiled polymer layer 208 in FIG. 2A is formed by a printing deposition process or a spray deposition process. The maximal thickness of the polymer layer 208 (which is in the pad regions 210) is 20 to 100 μm, once fully cured.

Figure 2B:
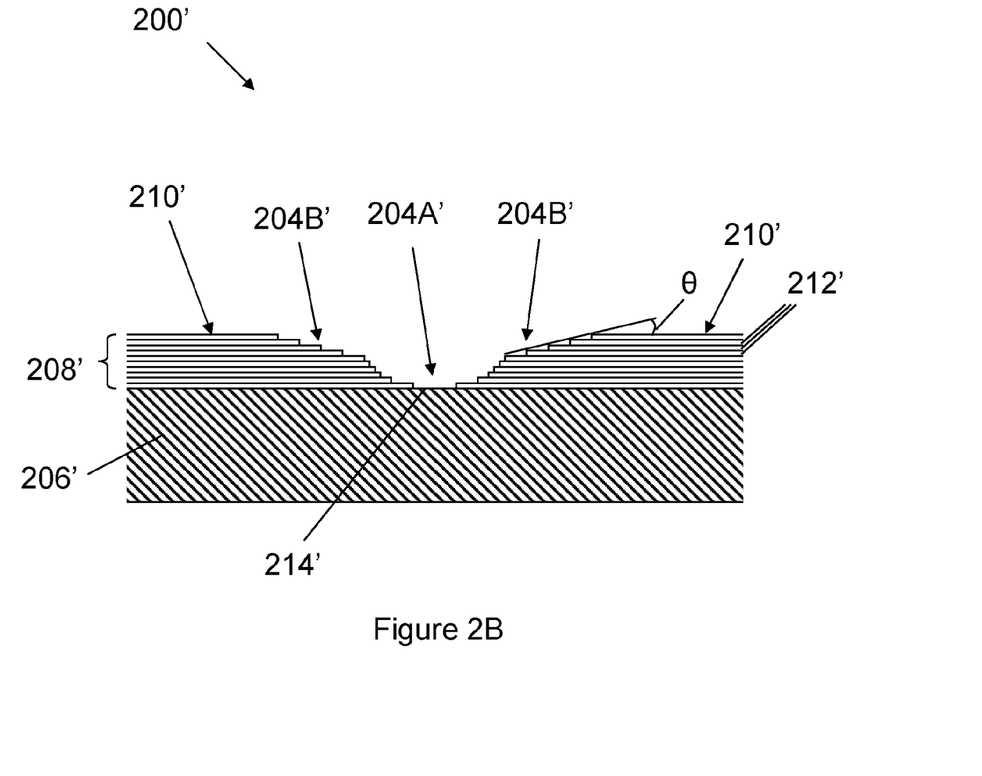
FIGS. 2B and 2C show cross-sectional views of a thrust washer according to the first embodiment the present invention, formed by a second manufacturing method, and shown at different stages of manufacture before and after a prolonged curing stage.

FIG. 2B illustrates a corresponding thrust washer 200, prior to a prolonged final curing stage, in which the profiled polymer layer 208' is instead formed by a multi-layered deposition process, in which successive polymer sub-layers 212' that are deposited on the substrate 206' have different patterns (e.g. successive layers may be narrower), that build-up to form the profiled polymer layer 208'. Multi-layer deposition enables accurate control of the thickness of the profiled polymer layer 208'. Between deposition of successive sublayers 212', each sub-layer is dried to remove solvent (known as "flash-curing"), and after deposition of the final sub-layer, the assembled profiled polymer layer 208' is cured by prolonged heating to set the polymer (e.g. inducing cross-linking).

Figure 2C:
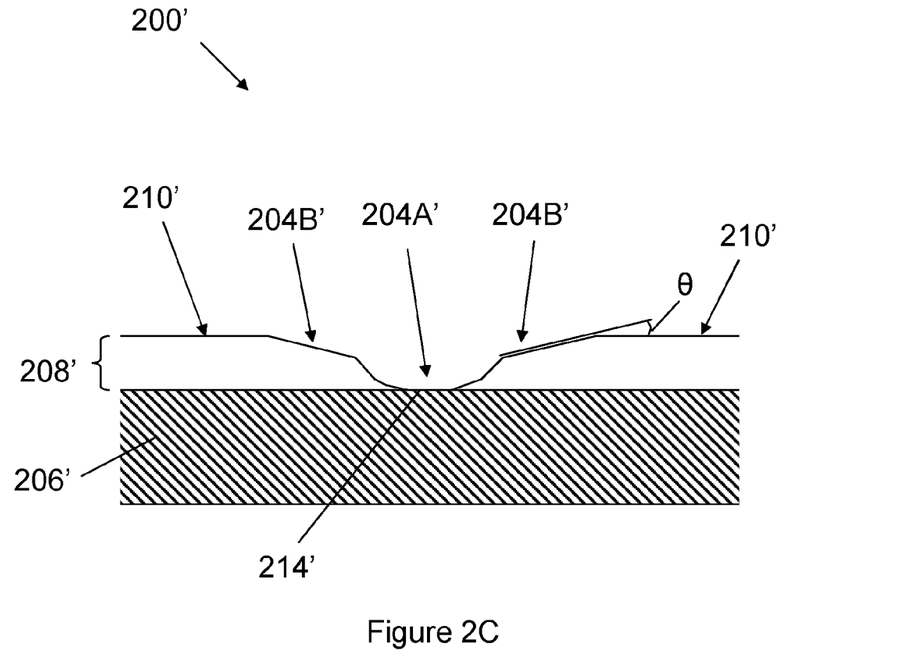

Curing the polymer smoothes the profile of the profiled polymer layer 208', and the polymer may comprise a levelling agent, which further promotes smoothing of the profile. FIG. 2C shows the thrust washer after it has been cured.

FIG. 2B shows the profiled polymer layer 208' built-up by only a small number of polymer sub-layers 212' (e.g. 1 to 25 μm thick sub-layers). However, to promote evaporation of the solvent after the deposition of each sub-layer, a larger number of thinner polymer layers 212' may be used. Further, the use of thinner sub-layers enables the profiled polymer layer to be formed with greater accuracy. For example, each polymer sub-layer 212' may be no more than 2 μm thick, and the thickness of the profiled polymer layer 208' in the ramp region 204A and 204B may increase by 20 μm to 55 μm, over a length (parallel to the substrate 206) of several millimeters.

Suitable processes by which polymer layers 212' may be deposited include spraying, screen printing and pad printing. In particular, screen printing or pad printing may be used to deposit patterned polymer layers, e.g. one or more layers of uniform thickness.

Figure 3A:
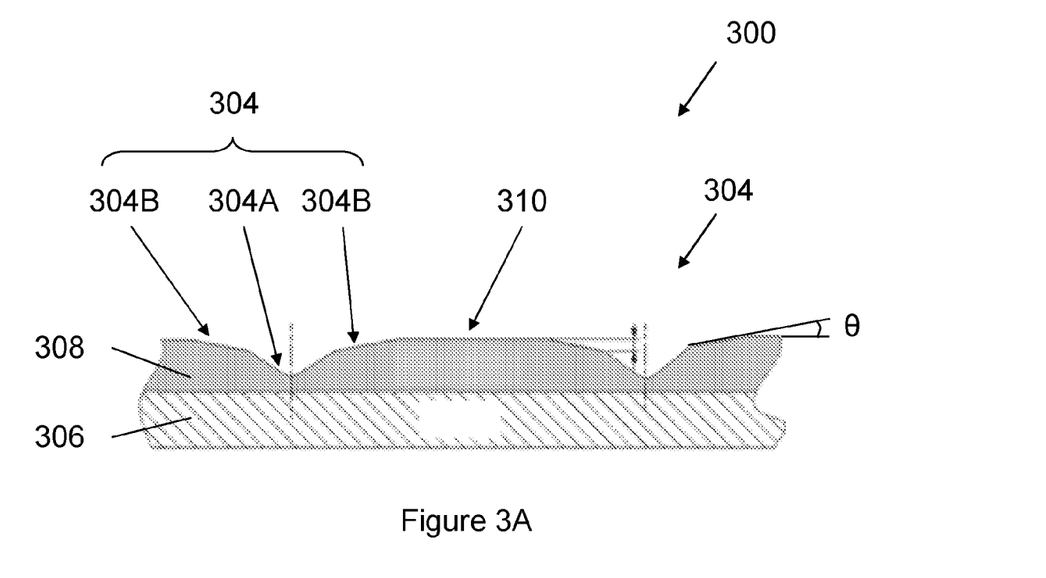
FIGS. 3A and 3B show cross-sectional views of thrust washers according to a second embodiment the present invention, formed by two different manufacturing methods.
Figure 3B:
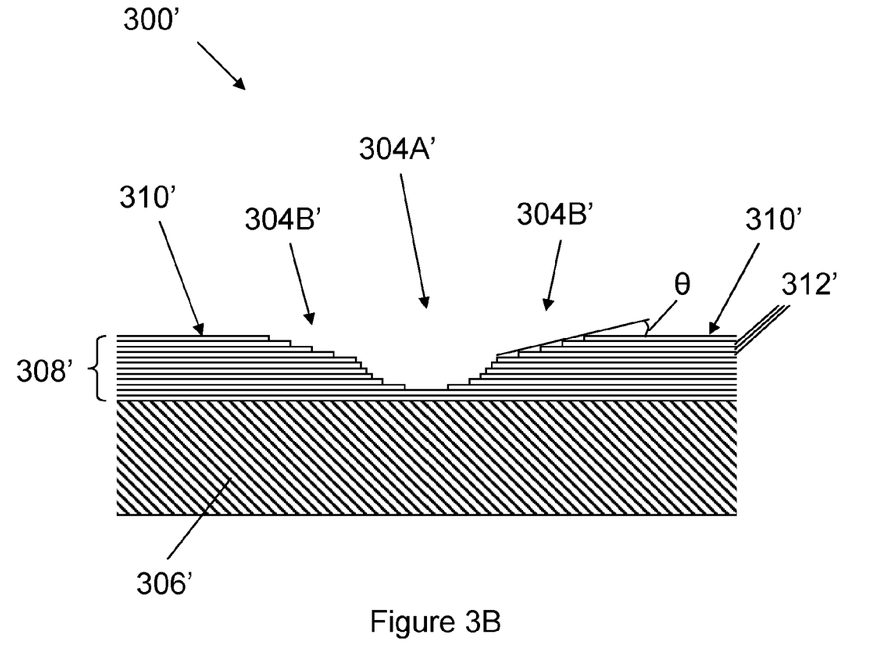

The oil distribution grooves 204 in FIG. 2A extend through the profiled polymer layer 208 to expose regions 214 of the substrate 206. In contrast, the profiled polymer layer 308 may extend across the substrate without a break, as illustrated in FIGS. 3A and 3B. Advantageously, in such thrust washers 300 and 300', a barrier of polymer material is provided between the substrate 306 and the lubricating oil, in use, preventing corrosion of the substrate 306 and 306' by additives in the lubricating oil.

Figure 4A:
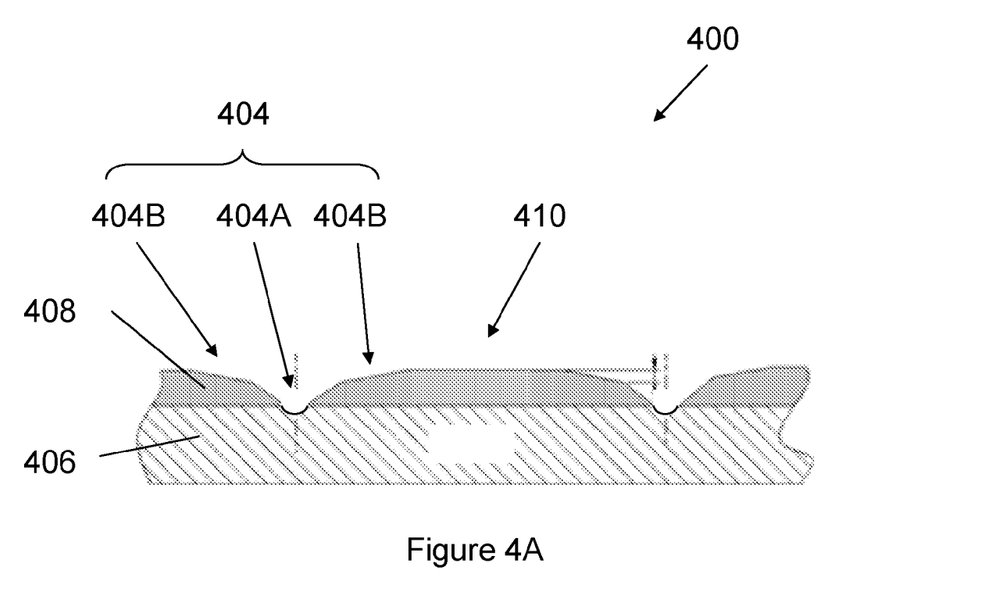
FIG. 4A shows a cross-sectional view of a thrust washer according to a third embodiment the present invention.

FIG. 4A illustrates a third embodiment in which the oil distribution grooves 404 extend through the profiled polymer layer 408 into the substrate 406. In particular, the channel 404A may be provided recessed into the substrate 406, whilst the ramp regions 404B are provided in the profiled polymer layer 408. Such an arrangement may be more easily manufactured, by machining or embossing the channel 404A into the substrate 406, and forming the ramp regions 404B by profiling the polymer layer 408. Formation of the channel 404A has wider tolerances than the formation of the ramp regions 404B, and advantageously, forming the channel in the substrate enables it to be more quickly formed. Further, forming only the ramp regions 404B in the profiled polymer layer 408, requires a thinner polymer, which can be more quickly manufactured and with greater accuracy.

Figure 4B:
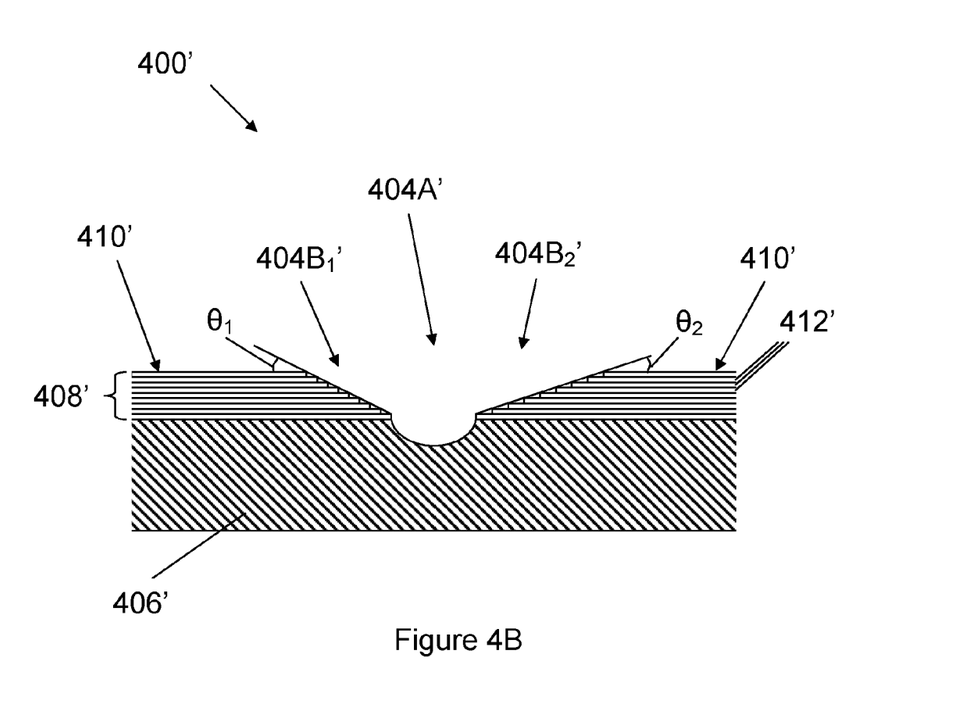
FIGS. 4B and 4C show cross-sectional views of alternative thrust washers according to the third embodiment of the present invention.

FIG. 4B illustrates an alternative design of the third embodiment, formed by the multi-layer deposition process. Advantageously, for the multi-layer deposition process, forming only the ramp regions 404 $B_1'$ and 404$B_2'$ in the profiled polymer 408' enables the thrust washer 400' to be formed more quickly as it requires deposition and curing of fewer polymer layers 412'.

In FIGS. 2A to 4A each oil distribution groove is substantially symmetric, having a channel formed between a pair of ramp regions having equal ramp slopes. However, the thrust washer may be optimised for rotation of the shaft in a particular direction, in which case the ramp regions may have different ramp slopes (i.e. the oil distribution grooves may have asymmetric cross-sections), or one of the ramp regions may be omitted. Accordingly, FIG. 4B illustrates a thrust washer 400' having ramp regions 404 $B_1'$ and 404$B_2'$ having different ramp slopes $\theta_1$ and $\theta_2$.

Figure 4C:
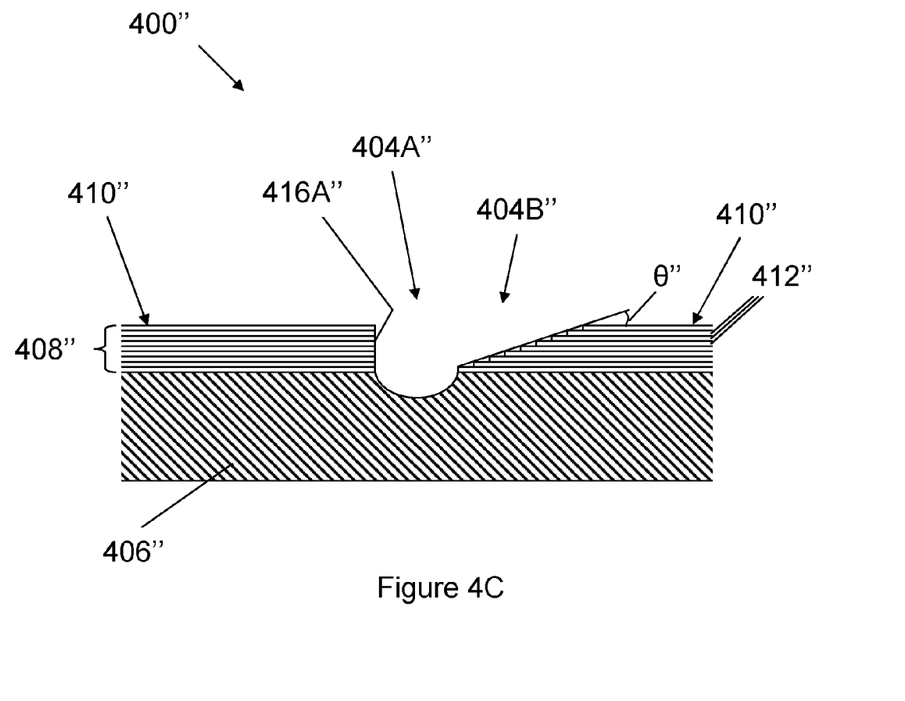

Similarly, FIG. 4C illustrates a thrust washer 400" in which the oil distribution groove has only one ramp region 404B", with a relatively abrupt edge 416" (e.g. providing an edge that is perpendicular to the plane of the thrust washer, or at more than 45° to the plane of the thrust washer) to the polymer 408" on the other side of the channel 404A".

Figure 5A:
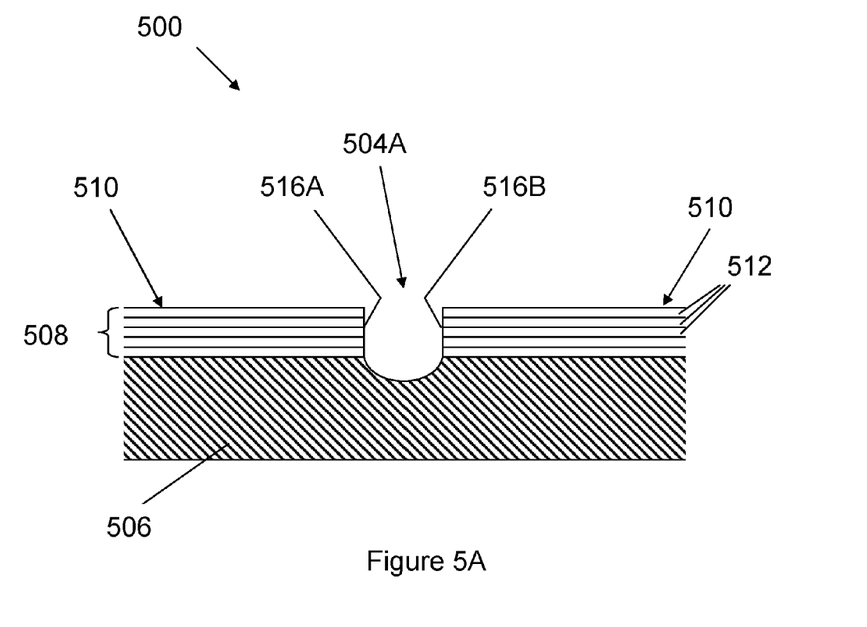
FIG. 5A shows a cross-sectional view of a thrust washer according to a fourth embodiment of the present invention.

In FIGS. 2A to 4C, each oil distribution groove has comprises a channel and at least one ramp region. However, as illustrated in the embodiment of FIG. 5A, the thrust washer 500 may comprise oil distribution grooves without ramp regions, in which the grooves each comprise channels 504A, which are defined by abrupt edges 516A and 516B (e.g. providing an edge that is perpendicular to the plane of the thrust washer, or that is at an angle of more than 45° to the plane of the thrust washer) through the profiled polymer 508 to a recessed channel 518 formed in the substrate 506. Alternatively, the oil distribution grooves may extend only to the surface of the substrate, like the grooves 204A in FIG. 2A, or may be less deep than the maximum thickness of the polymer, like the grooves 304A in FIG. 3A.

Figure 5B:
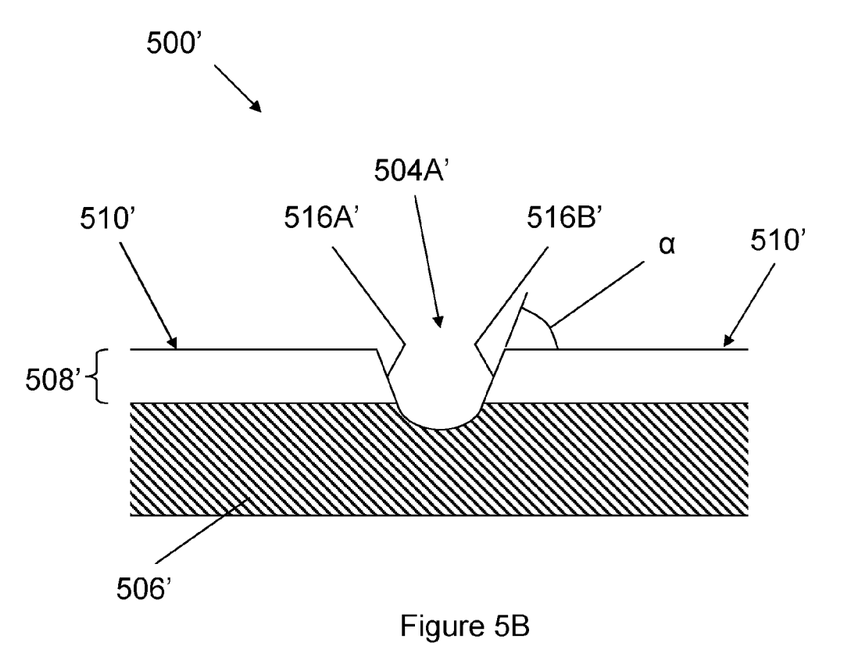
FIG. 5B shows a cross-sectional view of a thrust washer according to a fifth embodiment of the present invention.

FIG. 5A shows such an embodiment in which the abrupt edges 516A and 516B are substantially perpendicular to the plane of the thrust washer, before the polymer sub-layers 512 have undergone a prolonged cure. In depositing polymer sub-layers 512 having the same pattern (e.g. where there is no requirement for a stepped ramp region to smooth during curing), the profiled polymer layer 508 may be deposited in thicker sub-layers, e.g. up to 25 µm thick, enabling more rapid deposition, with lower manufacturing cost. FIG. 5B shows a similar embodiment, 500', after the sub-layers have undergone a prolonged cure, and which differs from the embodiment of FIG. 5A by the abrupt edges 516A' and 516B' of the polymer layer 508' having an edge that is at an angle of more than 45° to the plane of the thrust washer (e.g. 65°).

Figure 6:
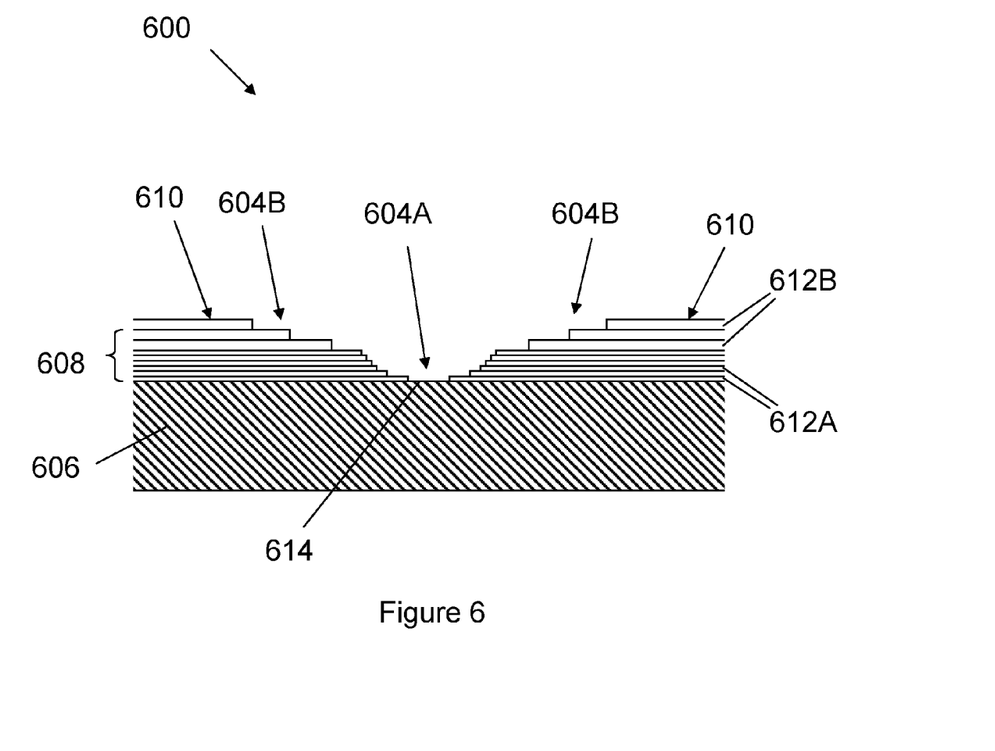
FIG. 6 shows a cross-sectional view through a thrust washer according to a sixth embodiment of the present invention.

The sub-layers 612A and 612B of the profiled polymer layer may have different thicknesses and physical properties, as illustrated in FIG. 6. For example, the sub-layers 612B further from the substrate 606, may be thicker than the sub-layers 612A adjacent the substrate.

In the illustrated examples: The metal substrate is a steel substrate. The profiled polymer layer is a composite of a plastics polymer matrix and particulate distributed throughout the matrix. The plastics polymer material is selected from the group consisting of: polyimide/amide resin, acrylate resin, epoxy resin, fluoropolymer and formaldehyde. In particular, the polymer may be a composite polyimide/amide based polymer, such as a composite having a matrix of a polyimide/amide plastics polymer material and having distributed throughout the matrix: from 5 to less than 25% vol of a metal particulate (e.g. metal powder and/or metal flakes); from 1 to 20% vol of a fluoropolymer, the balance being the polyimide/amide resin apart from incidental impurities. Further, the polymer composite may be 12.5% vol Al, 5.7% vol PTFE particulate, 4.8% vol silane, <0.1% vol other components, and balance (approximately 77% vol) polyimide/amide.

Although illustrated in FIGS. 1A and 1B in relation to a generally semi-annular thrust washer, the present invention equally applies to annular or circular thrust washers.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A thrust washer for a sliding bearing, comprising:
a thrust washer substrate having an axial face, and
a polymer layer of profiled thickness on the axial face of the substrate,
wherein the profiled polymer layer is provided with at least one oil distribution groove, and includes a stacked plurality of polymer sub-layers.

2. The thrust washer according to claim 1, wherein the polymer sub-layers are differently patterned.

3. The thrust washer according to claim 1, wherein the at least one oil distribution groove extends only part way through the profiled polymer layer.

4. The thrust washer according to claim 1, wherein the at least one oil distribution groove extends through the profiled polymer layer, and the profiled polymer layer comprises a plurality of disconnected portions, separated by the at least one oil distribution groove.

5. The thrust washer according to claim 4, wherein the at least one oil distribution groove extends into the thrust washer substrate.

6. The thrust washer according to claim 1, wherein the at least one oil distribution groove comprises a channel and at least one ramp region.

7. The thrust washer according to claim 6, wherein the ramp region is provided in the profiled polymer layer, and the thickness of the profiled polymer layer in the at least one ramp region increases away from the channel.

8. The thrust washer according to claim 7, wherein the at least one ramp region has a ramp slope in which the increase in thickness of the polymer is less than 25 µm per 1 mm across the axial face, perpendicular to the at least one oil distribution groove.

9. The thrust washer according to claim 7, wherein the at least one oil distribution groove comprises a channel between a first ramp region and a second ramp region.

10. The thrust washer according to claim 6, wherein the at least one oil distribution groove comprises a channel between a first ramp region and a second ramp region.

11. The thrust washer according to claim 6, wherein the profiled polymer layer is provided with at least one pad region of uniform thickness adjacent the at least one oil distribution groove.

12. The thrust washer according to claim 1, wherein the plurality of polymer sub-layers comprises sub-layers of different thicknesses.

13. A flange bearing comprising a bearing shell and a thrust washer provided at an axial end of the bearing shell, the thrust washer including:
a thrust washer substrate having an axial face, and
a polymer layer of profiled thickness on the axial face of the substrate,
wherein the profiled polymer layer is provided with at least one oil distribution groove and with at least one pad region of uniform thickness adjacent the at least one oil distribution groove.

14. A method of manufacturing a thrust washer for a sliding bearing, the thrust washer having a thrust washer substrate having an axial face and a profiled polymer layer on the axial face of the substrate, the profiled polymer layer being provided with at least one oil distribution groove, the method comprising:

forming the profiled polymer layer on the axial face of the substrate, and curing the profiled polymer layer;

wherein the profiled polymer layer is formed by depositing a plurality of polymer sub-layers.

15. The method according to claim 14, wherein the profiled polymer layer is formed by at least one of a spraying process and a printing process.

16. The method according to claim 15, wherein successive polymer sub-layers are differently patterned, to build up a profiled polymer layer of non-uniform thickness.

17. The method according to claim 14, wherein the plurality of polymer sub-layers comprises sub-layers of different thicknesses.

* * * * *